(12) United States Patent
Yamamoto et al.

(10) Patent No.: US 8,704,787 B2
(45) Date of Patent: Apr. 22, 2014

(54) INFORMATION PROCESSING APPARATUS, INFORMATION PROCESSING METHOD, AND COMPUTER PROGRAM

(75) Inventors: Kazuyuki Yamamoto, Kanagawa (JP); Ikuo Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 13/107,308

(22) Filed: May 13, 2011

(65) Prior Publication Data

US 2011/0304567 A1 Dec. 15, 2011

(30) Foreign Application Priority Data

Jun. 10, 2010 (JP) ................... 2010-132753

(51) Int. Cl.
*G09G 5/00* (2006.01)
(52) U.S. Cl.
USPC ........................................... 345/173
(58) Field of Classification Search
CPC ........................................ G09G 5/00
USPC ................ 345/173, 174; 348/171; 382/124
See application file for complete search history.

(56) References Cited

U.S. PATENT DOCUMENTS

| | | | | |
|---|---|---|---|---|
| 6,157,403 | A * | 12/2000 | Nagata | 348/171 |
| 8,131,027 | B2 * | 3/2012 | Mizushima et al. | 382/124 |
| 2005/0110769 | A1 | 5/2005 | DaCosta et al. | |
| 2006/0284856 | A1 * | 12/2006 | Soss | 345/173 |
| 2011/0285654 | A1 * | 11/2011 | Park et al. | 345/173 |
| 2012/0206399 | A1 * | 8/2012 | Wang et al. | 345/174 |

FOREIGN PATENT DOCUMENTS

| | | |
|---|---|---|
| JP | 2007-512619 | 5/2007 |
| JP | 2009-176245 | 8/2009 |
| JP | 2009-276992 | 11/2009 |

OTHER PUBLICATIONS

U.S. Appl. No. 13/183,623, filed Jul. 15, 2011, Yamano, et al.
U.S. Appl. No. 13/166,022, filed Jun. 22, 2011, Yamamoto, et al.

* cited by examiner

*Primary Examiner* — Fred Tzeng
(74) *Attorney, Agent, or Firm* — Oblon, Spivak, McClelland, Maier & Neustadt, L.L.P.

(57) ABSTRACT

There is provided an information processing apparatus including a contact detection unit capable of detecting a plurality of contact coordinates on an operation surface, and outputting a contact detection signal as a detection result, a load detection unit for detecting a load applied to the operation surface, and a coordinate estimation unit, wherein when a load detection result provided by the load detection unit satisfies a pressed coordinate retrieval condition, the coordinate estimation unit estimates a pressed coordinate from among the plurality of contact coordinates on the operation surface, on the basis of at least the contact detection signal.

11 Claims, 18 Drawing Sheets

INFORMATION PROCESSING APPARATUS, INFORMATION PROCESSING METHOD, AND COMPUTER PROGRAM

BACKGROUND

The present disclosure relates to an information processing apparatus, an information processing method, and a computer program, and more particularly to an information processing apparatus, an information processing method, and a computer program for processing operation/input given to an input device using a sensor capable of detecting a multi-touch gesture.

An example of a controller for a GUI (Graphical User Interface) widely available as a smartphone and the like is an input device using a sensor such as a touch panel. Touch panels capable of detecting a so-called multi-touch gesture, i.e., capable of simultaneously detecting touches with multiple fingers, are becoming widely available in recent years.

For example, Japanese Patent Application Laid-Open No. 2009-276992 discloses a technique relating to an operation input device using a touch panel. More specifically, Japanese Patent Application Laid-Open No. 2009-276992 discloses a coordinate input device for calculating a coordinate value of a pressed point by removing detected touch positions to which a predetermined pressing force is not applied from among touch positions detected by a touch panel sensor. This technique can reduce the error in the coordinate value at the pressed point detected by the touch panel sensor with respect to the pressed point that is actually pressed.

For example, Japanese Patent Application Laid-Open No. 2009-176245 discloses a display input device to which a user inputs information by causing a manipulation object to slide on or press a display screen. This device includes a display unit having an operation surface and displaying an input operation image and a planar input detection unit provided continuously on the surface opposite to the operation surface of the display unit, and the input detection unit detects pressing force applied via the display unit. Therefore, during operation/input, the display unit serves as a load transmission member, whereby the slide position and the amount of pressing force of the manipulation object can be detected at the back surface of the display unit.

Further, for example, Japanese Translation of PCT Application No. 2007-512619 discloses a system for adaptively interpreting user's intention on the basis of a parameter given by a contact detection input device. In the system, a processor receives a pressure signal representing pressure from an input device such as a touch pad, and compares a pseudo-pressure and a pressure threshold value. When the pseudo-pressure is determined to be larger than the pressure threshold value, a signal is determined to be received, and an output is given.

SUMMARY

A touch sensor capable of detecting a multi-touch gesture can be operated with multiple fingers at a time. Therefore, the touch sensor is expected to increase the speed of work. However, a system for operating the touch panel mainly accepts only three types of gestures, i.e., touch, release, and slide gestures. Therefore, the operating method is limited, and this does not necessarily increase the speed of work.

For example, when an input device such as an OSK (On Screen Keyboard) is used, a user typically taps the OSK. Therefore, although multi-touch gestures are enabled (the OSK can be used with both hands), the user actually uses the OSK with one finger of each of right and left hands alternately, and this causes an issue in that it is difficult to increase the operation speed.

Many touch panels, including those supporting the multi-touch gesture and those not supporting the multi-touch gesture, often use the following input operation. A preview screen is displayed in response to slide gesture, and as soon as a finger is released, an item is determined. However, there is an issue in that it is more difficult for a user to master a finger releasing gesture than a pressing gesture, and it is more troublesome for a user to do the finger retracting (releasing) action than the pressing action.

In order to solve such problem, a pseudo-pressure has been suggested. Based on the pseudo-pressure, an item is determined to be pressed when a size of a finger projected onto a touch sensor is determined to be more than a predetermined value or when the size of the finger increases, for example. When this technique is used, processing selected by pressing a touch panel can be determined, and even when multiple fingers are still placed on the touch panel, a pressing finger can be recognized. However, there is an issue in that this technique is not reliable since the detection error may be large depending on how the user places the fingers or how the user presses the touch panel, etc. In order to accurately detect pressing action, a method has been suggested to provide multiple pressure sensors on (or below) the touch sensor in a matrix form. However, this method has an issue in that the structure is complicated and this may increase the cost. In addition, due to the structure of the sensors, it is difficult for the touch surface of the body to be made of a hard material, and this causes an issue in that the reliability may not be ensured, and limitation is imposed on the degree of flexibility in the design.

In light of the foregoing, it is desirable to provide a novel and improved information processing apparatus, information processing method, and computer program, capable of accurately estimating a pressed portion of a touch sensor.

According to an embodiment of the present disclosure, there is provided an information processing apparatus which includes a contact detection unit capable of detecting a plurality of contact coordinates on an operation surface, and outputting a contact detection signal as a detection result, a load detection unit for detecting a load applied to the operation surface, and a coordinate estimation unit, wherein when a load detection result provided by the load detection unit satisfies a pressed coordinate retrieval condition, the coordinate estimation unit estimates a pressed coordinate from among the plurality of contact coordinates on the operation surface, on the basis of at least the contact detection signal.

The coordinate estimation unit may obtain relevance between the contact detection signal and the load detection result from the load detection result provided by the load detection unit and the contact detection signal, and the coordinate estimation unit may determine a contact coordinate whose relevance is equal to or more than a predetermined value, and adopts the determined contact coordinate as the pressed coordinate.

Moreover, the contact detection unit may output, as the contact detection signal, one of a contact size and a contact intensity at the contact coordinate.

Furthermore, the coordinate estimation unit may determine a contact coordinate at which a magnitude of the contact detection signal obtained from the operation surface changes most greatly, and may adopt the determined contact coordinate as the pressed coordinate.

Moreover, the coordinate estimation unit may determine a contact coordinate at which a degree of similarity is the largest between a waveform representing change of the contact detection signal at each contact coordinate and a waveform representing change of the load detection result provided by the load detection unit over time, and may adopt the determined contact coordinate as the pressed coordinate.

The coordinate estimation unit may output coordinate history information at the each contact coordinate as the contact detection signal.

Then, the coordinate estimation unit may determine a contact coordinate that changes most greatly from coordinate history information obtained from the contact detection signal before the load detection result satisfies the pressed coordinate retrieval condition, and may adopt the determined contact coordinate as the pressed contact coordinate.

Moreover, the coordinate estimation unit may determine a contact coordinate from the contact detection signal in a period of time before the load detection result satisfies the pressed coordinate retrieval condition, and may adopt the determined contact coordinate as the pressed contact coordinate.

The pressed coordinate retrieval condition may be determined to hold when the load detection result provided by the load detection unit attains a value more than a load threshold value.

Moreover, the pressed coordinate retrieval condition may be determined to hold when a rate of change of the load detection result provided by the load detection unit attains a value more than a load change threshold value.

Furthermore, according to another embodiment of the present disclosure, there is provided an information processing method which includes causing a contact detection unit capable of detecting a plurality of contact coordinates on an operation surface to output a contact detection signal as a detection result, causing a load detection unit to detect a load applied to the operation surface, and when a load detection result provided by the load detection unit satisfies a pressed coordinate retrieval condition, causing the coordinate estimation unit to estimate a pressed coordinate from among the plurality of contact coordinates on the operation surface, on the basis of at least the contact detection signal.

The program is stored in a storage device provided in a computer, and is read and executed by a CPU provided in the computer, so that the computer is caused to function as the above information processing apparatus. Further, a computer-readable recording medium storing the program is provided. Examples of recording media include a magnetic disk, an optical disk, and an MO (Magneto-Optical) disk. Examples of magnetic disks include a hard disk and a disk-shaped magnetic disk. Examples of optical disks include a CD (Compact Disc), a DVD-R (Digital Versatile Disc Recordable), and a BD (Blu-Ray Disc (registered trademark)).

As described above, the present disclosure provides the information processing apparatus, the information processing method, and the computer program capable of accurately estimating a pressed portion of a touch sensor.

BRIEF DESCRIPTION OF THE DRAWINGS

FIG. 21 is a block diagram illustrating an example of a hardware configuration of a mobile apparatus and the like.

DETAILED DESCRIPTION OF THE EMBODIMENT

Figure 1:
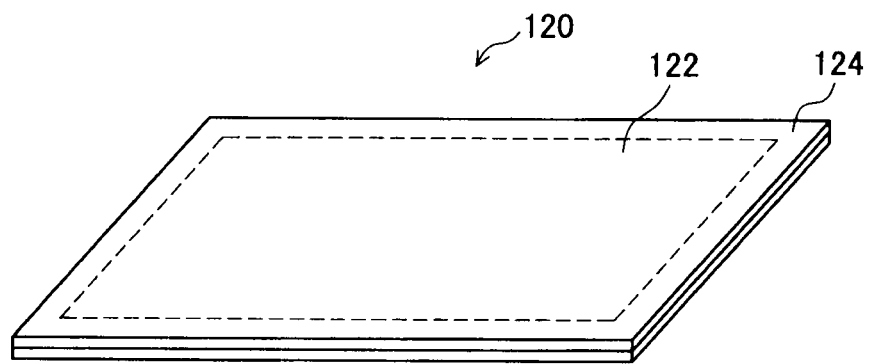
FIG. 1 is a schematic diagram illustrating a configuration of a touch sensor capable of detecting pressure according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order described below.

1. Configuration of mobile apparatus
2. Contact coordinate estimation function
3. Application to other input devices
4. Example of hardware configuration <1. Configuration of Mobile Apparatus>

Figure 2:
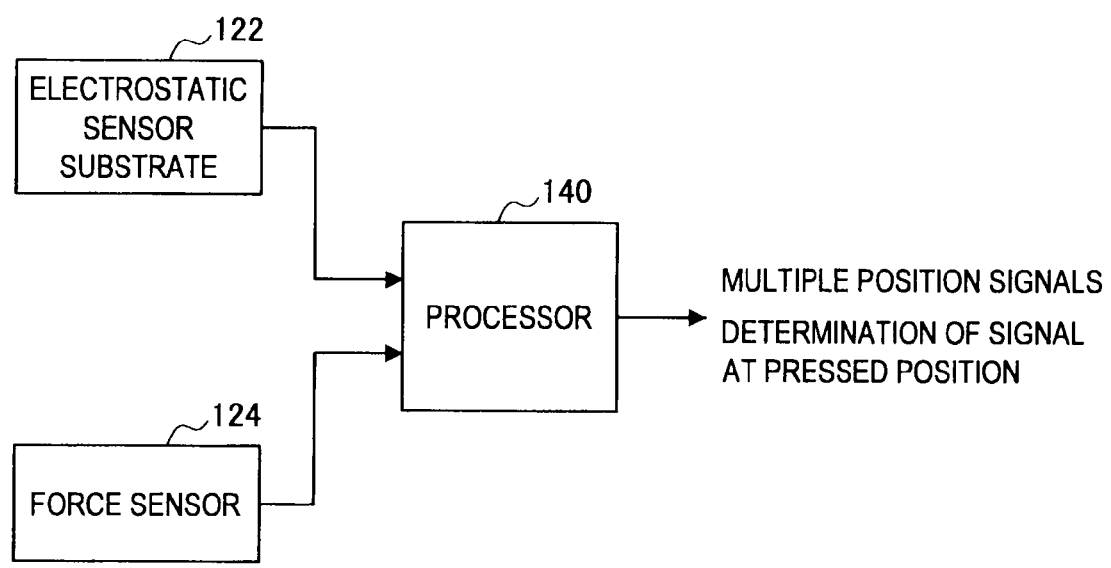
FIG. 2 is a block diagram illustrating a configuration of the touch sensor capable of detecting pressure according to the embodiment.
Figure 3:
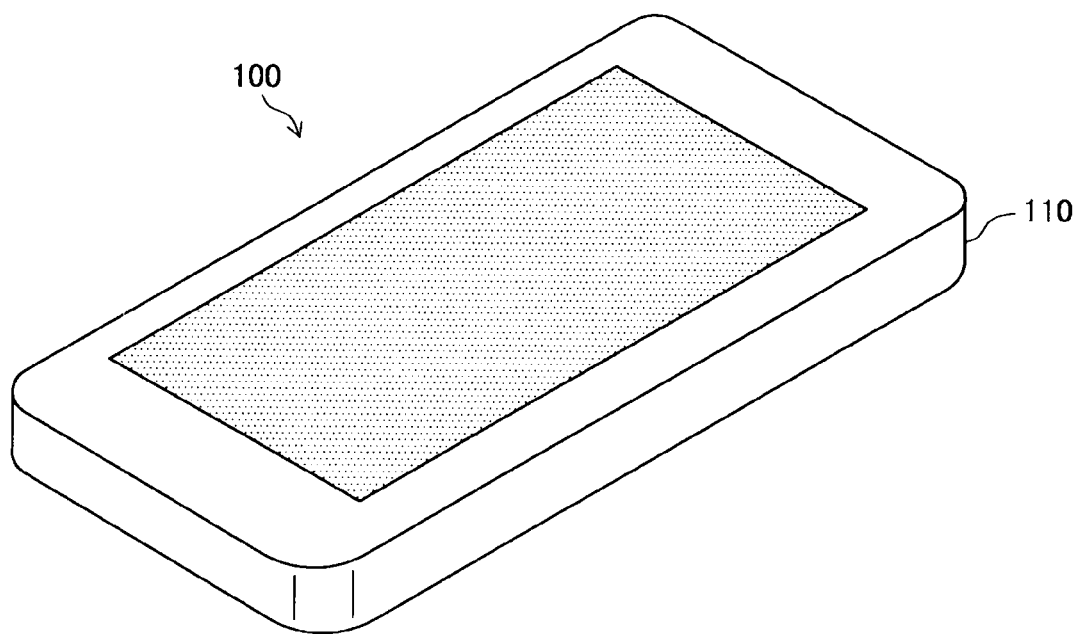
FIG. 3 is a schematic perspective view illustrating an example of an input device arranged with the touch sensor according to the embodiment.
Figure 4:
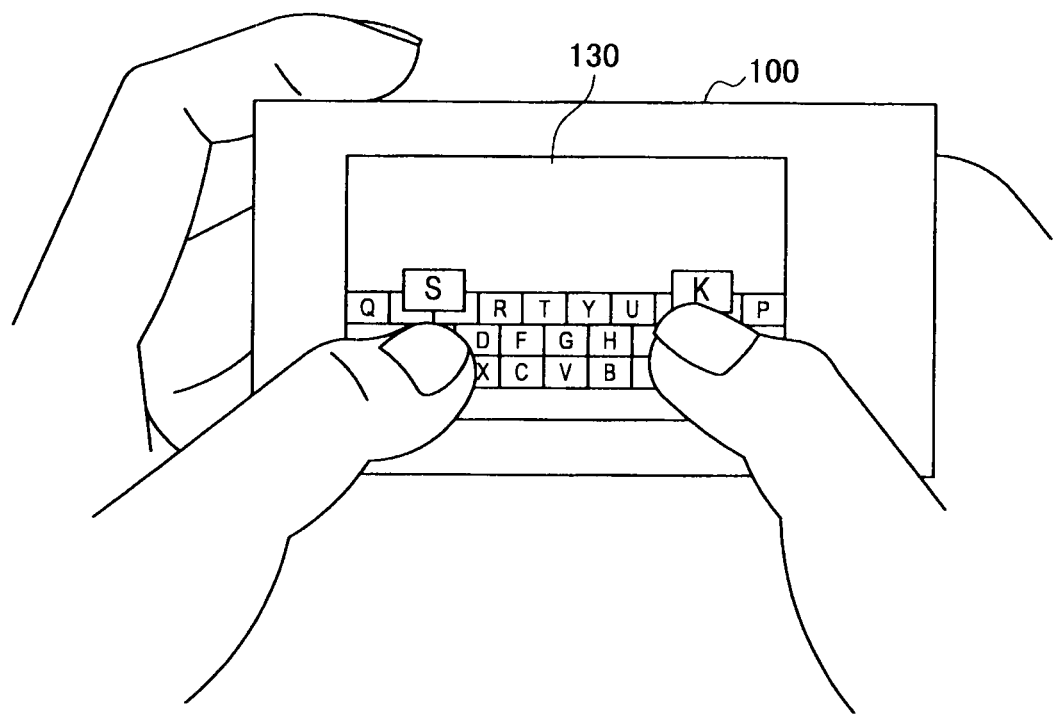
FIG. 4 is an explanatory diagram illustrating a state where an OSK is activated on the input device of FIG. 3.
Figure 5:
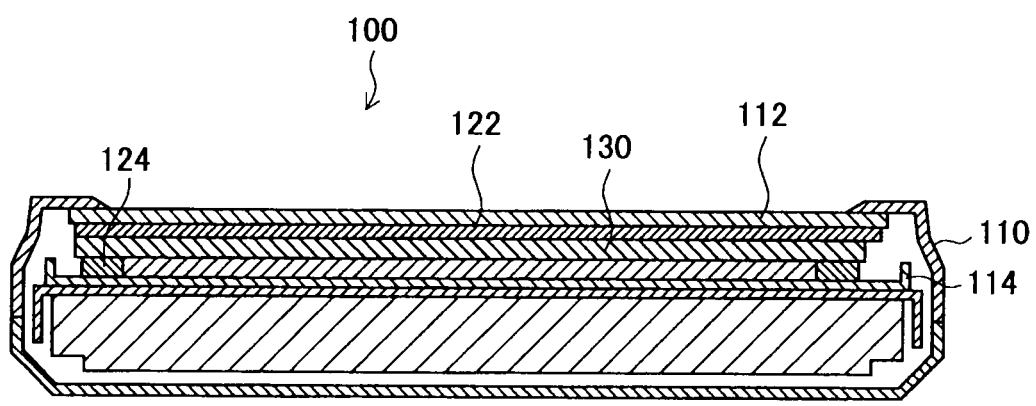
FIG. 5 is a cross sectional view illustrating a configuration of the input device of FIG. 3.

First, a schematic configuration of an input device according to an embodiment of the present disclosure will be explained with reference to FIGS. 1 to 11. FIG. 1 is a schematic diagram illustrating a configuration of a touch sensor capable of detecting pressure according to the present embodiment. FIG. 2 is a block diagram illustrating a configuration of the touch sensor capable of detecting pressure according to the present embodiment. FIG. 3 is a schematic perspective view illustrating an example of an input device arranged with the touch sensor according to the present embodiment. FIG. 4 is an explanatory diagram illustrating a state where an OSK is activated on the input device of FIG. 3. FIG. 5 is a cross sectional view illustrating a configuration of the input device of FIG. 3. FIGS. 6 to 11 are cross sectional views illustrating an example of arrangement of a force sensor in the input device.

[Configuration of Touch Sensor]

First, the configuration and functions of the touch sensor used in the input device according to the present embodiment will be explained with reference to FIGS. 1 and 2. As shown in FIG. 1, a touch sensor 120 according to the present embodiment includes an electrostatic sensor substrate 122 and a force sensor 124.

The electrostatic sensor substrate 122 is formed with an electrostatic detection grids (not shown) for detecting an x coordinate and a y coordinate. The electrostatic sensor substrate 122 can identify a contact coordinate of a manipulation object on the substrate on the basis of a change of capacitance of each grid caused by contact of the manipulation object. The electrostatic sensor substrate 122 according to the present embodiment can simultaneously detect contacts of multiple manipulation objects.

The force sensor 124 is a frame-shaped sensor arranged along an external periphery of the electrostatic sensor substrate 122. The force sensor 124 detects pressing force when a user uses the manipulation object to press the electrostatic sensor substrate 122 or a touch area of a body of the input device arranged with the electrostatic sensor substrate 122.

As shown in FIG. 2, the electrostatic sensor substrate 122 and the force sensor 124 are electrically connected to a processor 140 externally arranged via an FPC. The processor 140 obtains multiple position signals and a determination signal provided for a position pressed with the manipulation object, on the basis of the detection results provided by the electrostatic sensor substrate 122 and the force sensor 124. It should be noted that detailed processings performed by the processor 140 will be explained later in detail.

[Configuration of Mobile Apparatus]

As shown in FIG. 1, the touch sensor 120 is arranged in a mobile apparatus 100 as shown in FIG. 3, for example. For example, when an OSK function is executed on the mobile apparatus 100, an OSK for character input is displayed on a display 130 as shown in FIG. 4. The information processing apparatus according to the present embodiment, later explained, is mounted on the mobile apparatus 100. In this configuration, a user can simultaneously touch arbitrary multiple positions, and can input a character by pressing a desired character key. As compared with a touch panel in the related art, less limitations imposed on the operation are caused by the device, and the user can perform input operation by pressing the OSK. Therefore, the user can perform input operation faster and it is less cumbersome for the user to perform input operation.

As shown in FIG. 5, the mobile apparatus 100 includes a main substrate, a battery (not shown), and the like in a body 110 that can be held by a hand. The main substrate includes the electrostatic sensor substrate 122 and the force sensor 124 as shown in FIG. 1, and a liquid crystal display 130, an MPU, and the like. A cover 112, the electrostatic sensor substrate 122, the liquid crystal display 130, and the force sensor 124 are provided in this order from the display surface side of the mobile apparatus 100 (upper side of FIG. 5). The force sensor 124 is fixed to a receiving plate 114 in the body 110. The receiving plate 114 is fixed to the body 110.

In the present embodiment, a capacitance sensor for detecting change of a capacitance is used as the touch panel, but the present disclosure is not limited thereto. For example, the touch panel may use an optical in-cell touch sensor for detecting contact of a manipulation object on the basis of the intensity of returning light and a contact size, or may use a SAW touch sensor for detecting contact of a manipulation object on the basis of the intensity of a reflected wave from a finger. Alternatively, the touch panel may use a gird-type resistive film touch sensor for detecting contact of a manipulation object on the basis of the magnitude of resistance or the like. As described above, a touch sensor using other detection principles may be applied to the mobile apparatus 100 according to the present embodiment. The type of the touch sensor may be not only a two-dimensional sensor for determining a coordinate in a two-dimensional space such as a touch panel and a touch pad but also an in-line one-dimensional sensor.

The force sensor 124 may be various kinds of sensors such as a PZT-type sensor, an electrostatic capacitance-type sensor, a resistance-type sensor, and a strain gauge. In the present embodiment, a press position is not determined on the basis of the detection result of the force sensor 124. Therefore, the force sensor 124 can be arranged with a degree of flexibility. Therefore, the design of the mobile apparatus 100 can be determined with a higher degree of flexibility. FIGS. 6 to 11 illustrate examples of arrangements of the force sensor.

Figure 6:
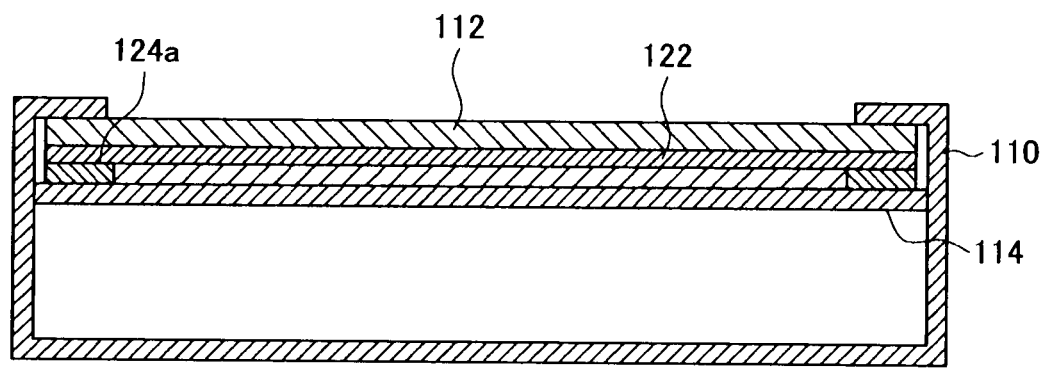
FIG. 6 is a cross sectional view illustrating an example of arrangement of a force sensor in the input device.

FIG. 6 illustrates the same configuration as FIG. 5, and a force sensor 124a is arranged below the electrostatic sensor substrate 122 (inner side of the body 110). The force sensor 124a has a frame-shape along an external periphery of the electrostatic sensor substrate 122. This configuration is suitable for a case where the force sensor 124a is an electrostatic force sensor or a resistive force sensor.

Figure 7:
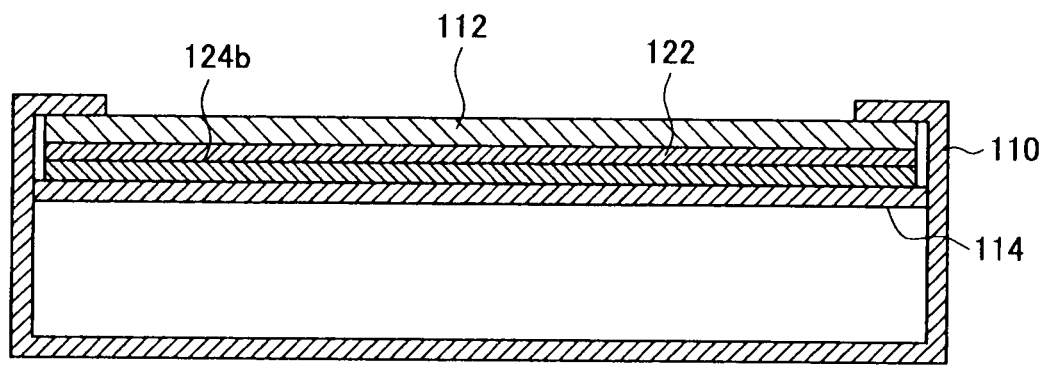
FIG. 7 is a cross sectional view illustrating another example of arrangement of a force sensor in the input device.

Like FIG. 6, FIG. 7 is also configured such that a force sensor 124b is also arranged below the electrostatic sensor substrate 122 (inner side of the body 110) but FIG. 7 is different from the configuration of FIG. 6 in that the force sensor 124b has a planar shape. In other words, the force sensor 124b is arranged to face the entire surface of the electrostatic sensor substrate 122. This configuration is suitable for a case where the force sensor 124b is an electrostatic force sensor or a resistive force sensor.

Figure 8:
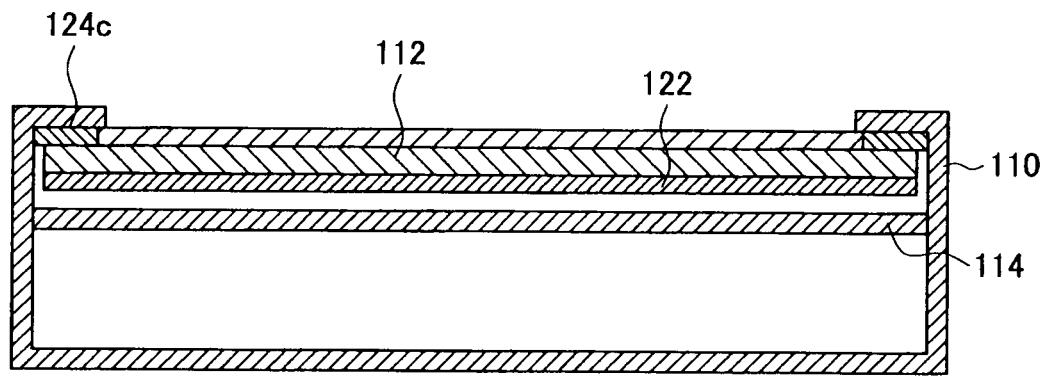
FIG. 8 is a cross sectional view illustrating another example of arrangement of a force sensor in the input device.

FIG. 8 is an example where a force sensor 124c is arranged above the electrostatic sensor substrate 122 (outer side of the body 110). The force sensor 124c is provided between a portion of the body 110 and the electrostatic sensor substrate 122 with the cover 112 provided therebetween. When force is applied from the display surface side of the mobile apparatus 100, the force sensor 124c is pulled away from the body surface where the force sensor 124c is fixed, whereby the force sensor 124c detects the load. At this occasion, the receiving plate 114 in the body 110 functions as a stroke limiter for limiting movement of the force sensor 124c and the like that are moved by the load applied from the display surface side. This configuration is also suitable for a case where the force sensor 124c is an electrostatic force sensor or a resistive force sensor.

Figure 9:
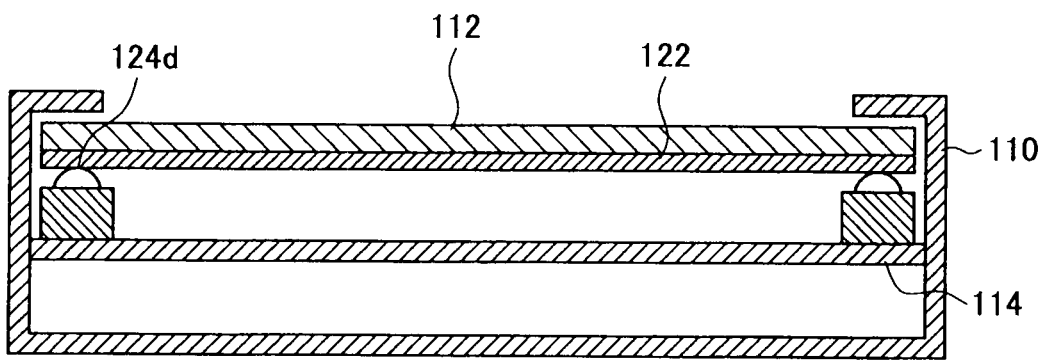
FIG. 9 is a cross sectional view illustrating another example of arrangement of force sensors in the input device.

FIG. 9 is an example where force sensors 124d are arranged below the electrostatic sensor substrate 122 (inner side of the body 110), but FIG. 9 is different from the configurations of FIGS. 5, 6 in that the force sensor 124d is in point contact with the electrostatic sensor substrate 122. In FIG. 9, the two force sensors 124d are provided in proximity to external edges of the electrostatic sensor substrate 122. However, the present disclosure is not limited thereto. For example, only one force sensor 124d may be provided in a central portion of the electrostatic sensor substrate 122. This configuration is suitable for a case where the force sensor 124d is a PZT-type force sensor.

Figure 10:
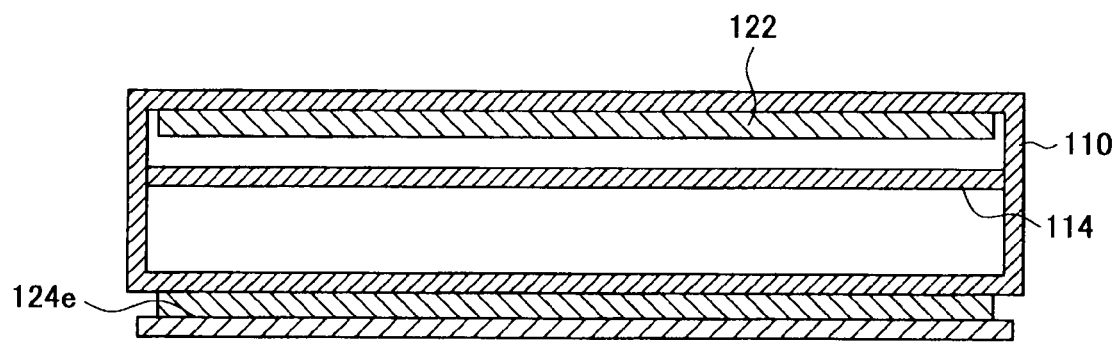
FIG. 10 is a cross sectional view illustrating another example of arrangement of a force sensor in the input device.

FIG. 10 illustrates an example where a force sensor 124e is provided in the body 110 at the side opposite to the display surface of the mobile apparatus 100. The force sensor 124e detects pressure applied onto the display surface by using the law of action and reaction, i.e., when the display surface of the mobile apparatus 100 is pressed, load is also applied to the back surface side. When the body 110 is configured to be dividable into two pieces, i.e., the display surface side and the back surface side, as shown in FIG. 5, the force sensor 124e may be arranged to be sandwiched between the divided bodies. This configuration is suitable for a case where the force sensor 124e is an electrostatic force sensor or a resistive force sensor.

Figure 11:
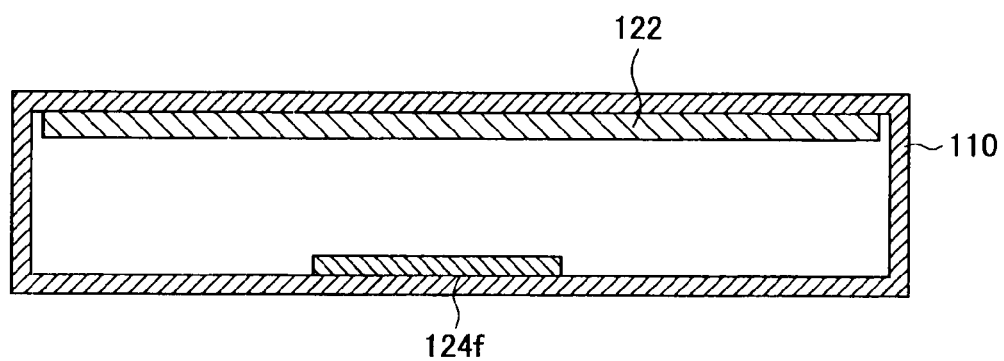
FIG. 11 is a cross sectional view illustrating another example of arrangement of a force sensor in the input device.

FIG. 11 is an example using a strain gauge as a force sensor 124f. Since the strain gauge is used, the force sensor 124f can be provided in the body 110, which enable seamless design. In the example of FIG. 11, the force sensor 124f is provided at the back surface side in the body 110. However, the present disclosure is not limited thereto. For example, the force sensor 124f may be provided at the display surface side in the body 110.

The above mobile apparatus 100 uses the electrostatic sensor substrate 122 capable of detecting a multi-touch gesture and the force sensor 124 capable of detecting load, thus accurately estimating the contact coordinate on the display surface that is pressed with the manipulation object. A functional configuration of the processor 140 functioning as the information processing apparatus estimating a contact coordinate will be hereinafter explained, and contact coordinate estimation processing achieved with the processor 140 will be explained.

<2. Contact Coordinate Estimation Function>
[Functional Configuration for Estimating Contact Coordinate]

Figure 12:
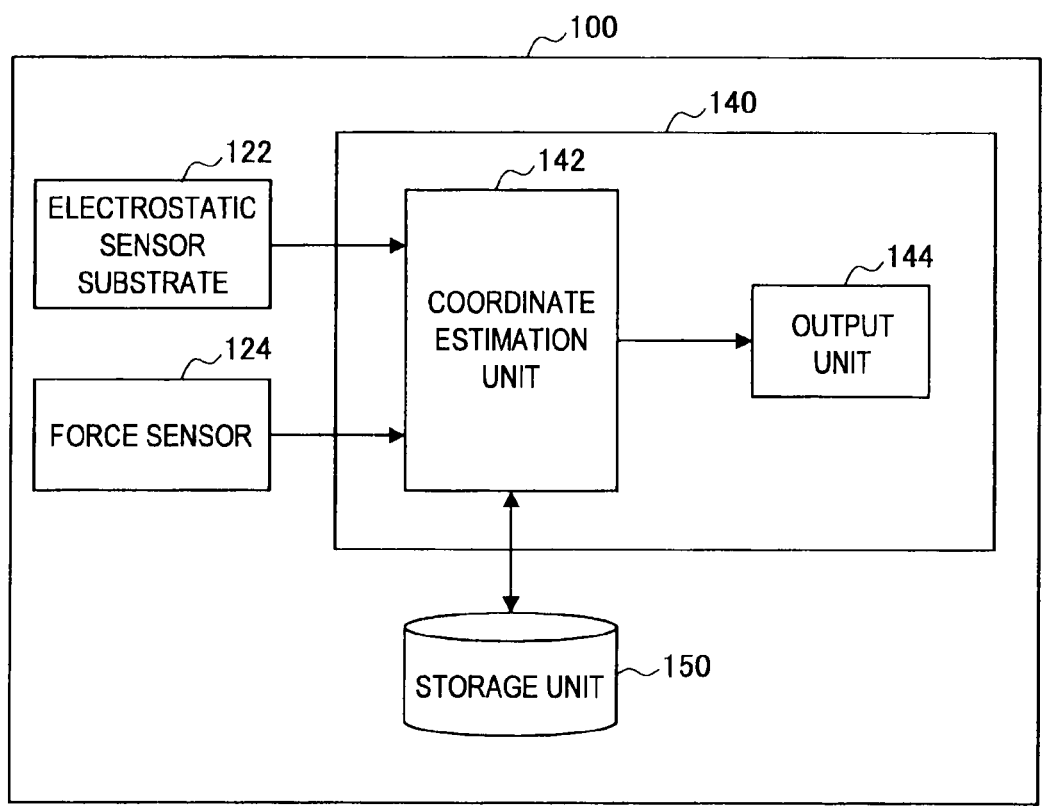
FIG. 12 is a block diagram illustrating a functional configuration for estimating a contact coordinate according to the embodiment.

First, the functional configuration for estimating a contact coordinate according to the present embodiment will be explained with reference to FIG. 12. FIG. 12 is a block diagram illustrating a functional configuration for estimating a contact coordinate according to the present embodiment.

In the mobile apparatus 100 according to the present embodiment, the processor 140 estimates the contact coordinate. As shown in FIG. 12, the processor 140 includes a coordinate estimation unit 142 and an output unit 144. The coordinate estimation unit 142 estimates a coordinate position that is manipulated by the manipulation object on the basis of detection results provided by the electrostatic sensor substrate 122 and the force sensor 124, and outputs an estimation result to another constituent element of the mobile apparatus 100 (not shown) via the output unit 144. The coordinate estimation unit 142 can look up and update information stored in a storage unit 150.

[Contact Coordinate Estimation Processing]

Figure 13:
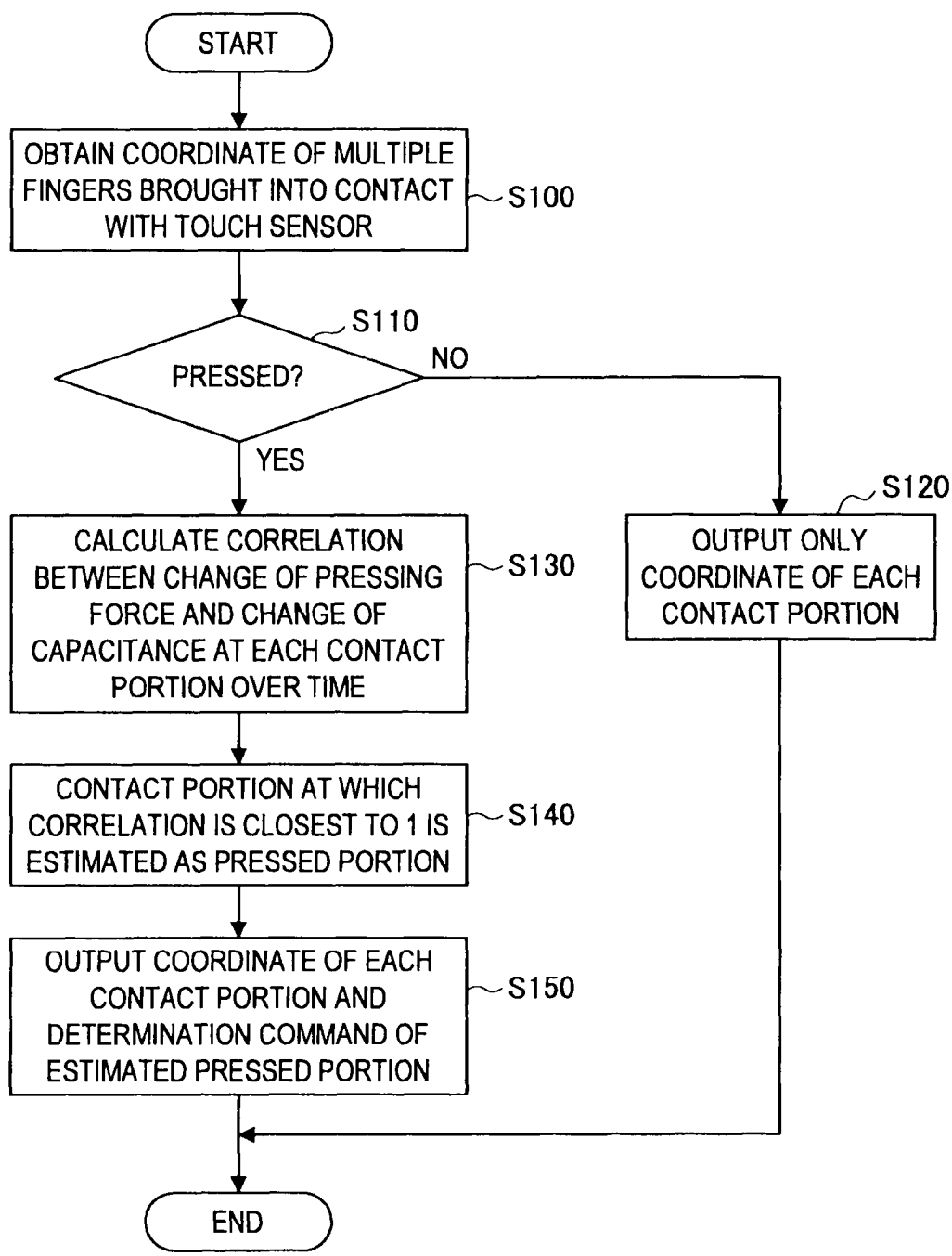
FIG. 13 is a flowchart illustrating contact coordinate estimation processing according to the embodiment.
Figure 14:
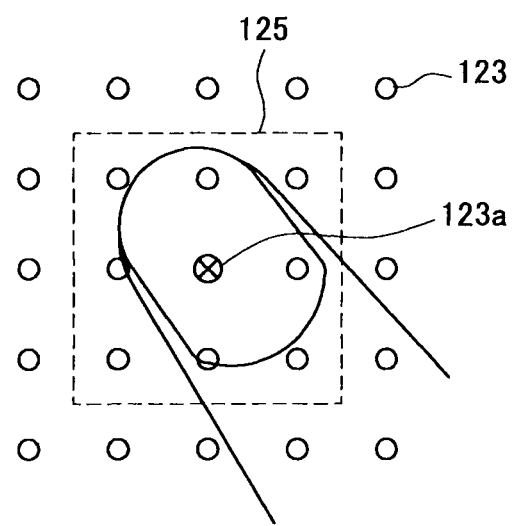
FIG. 14 is an explanatory diagram illustrating how an electrostatic sensor substrate detects a contact position of a manipulation object.
Figure 15:
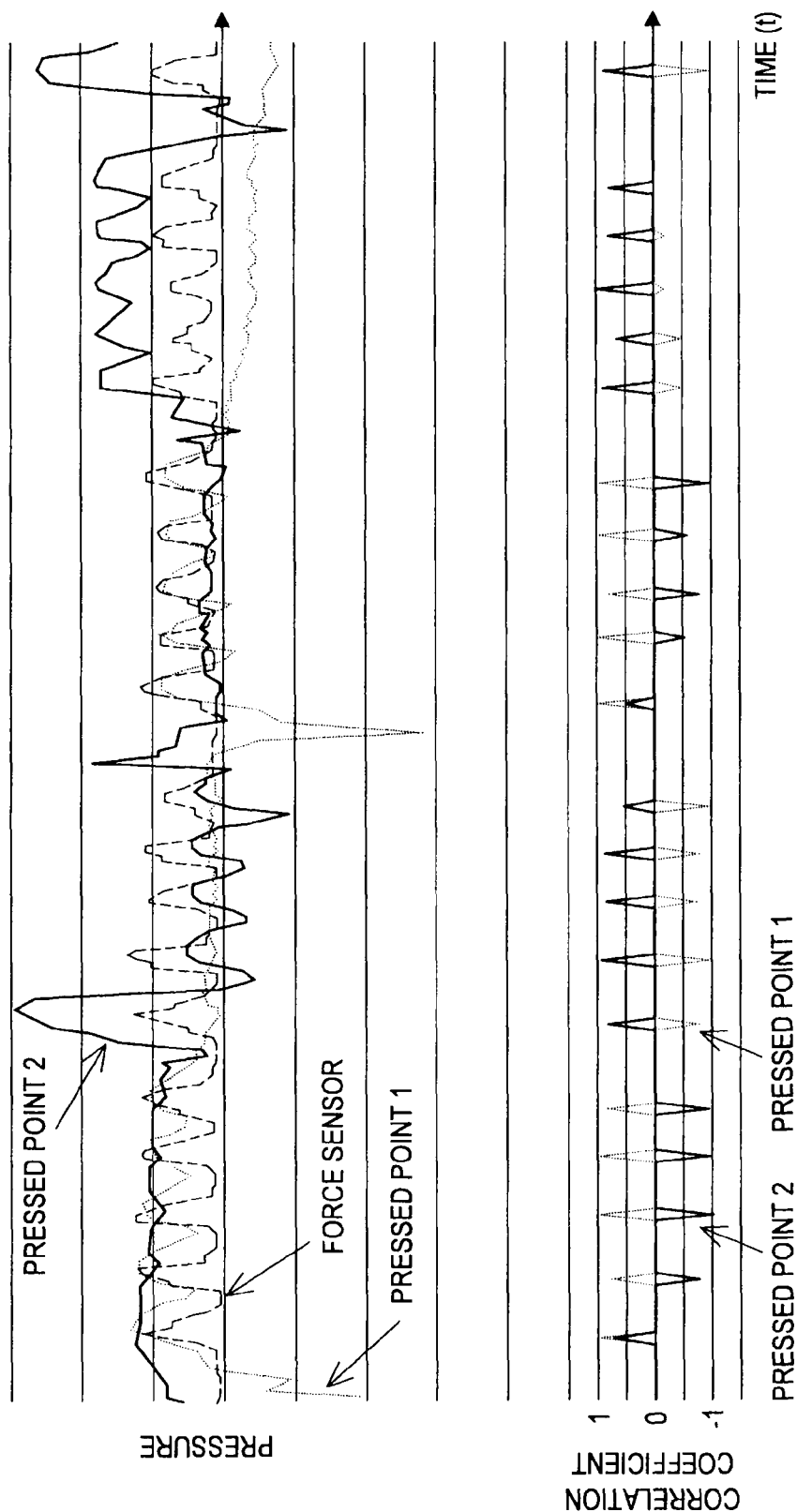
FIG. 15 is a graph illustrating detection values of the electrostatic sensor substrate and the force sensor and correlation therebetween.

Subsequently, the contact coordinate estimation processing performed by the coordinate estimation unit 142 of the processor 140 according to the present embodiment will be explained with reference to FIGS. 13 to 15. FIG. 13 is a flowchart illustrating the contact coordinate estimation processing according to the present embodiment. FIG. 14 is an explanatory diagram illustrating how the electrostatic sensor substrate 122 detects a contact position of the manipulation object. FIG. 15 is a graph illustrating detection values of the electrostatic sensor substrate 122 and the force sensor 124 and correlation therebetween.

The contact coordinate estimation processing performed by the information processing apparatus is initiated when a user touches the electrostatic sensor substrate 122 or the body 110 arranged with the electrostatic sensor substrate 122 with one or multiple fingers. When the fingers come into contact with the electrostatic sensor substrate 122, the coordinate estimation unit 142 identifies the contact coordinates on the basis of change of a capacitance in each grid of the electrostatic sensor substrate 122 (S100). As shown in FIG. 14, the electrostatic sensor substrate 122 includes capacitance nodes (detection points) 123 arranged in a matrix form. When a finger comes into contact with the display surface, this changes the capacitances detected by the nodes 123. At this occasion, in the entire electrostatic sensor substrate 122, the coordinate estimation unit 142 checks the capacitance values in a detection region 125 including 3×3 nodes 123, for example. Then, the coordinate estimation unit 142 identifies a center node 123a in the detection region 125 having a high capacitance as a position where the finger is in contact.

On the other hand, when the user presses the electrostatic sensor substrate 122 with one finger in order to, for example, decide an operation, the output of the force sensor 124 changes, and the pressing force detected by the force sensor 124 is output to the coordinate estimation unit 142 of the processor 140. The coordinate estimation unit 142 determines whether the user presses the display surface with the finger on the basis of the pressing force input by the force sensor 124 (S110). For example, the coordinate estimation unit 142 determines that the user presses the display surface with the finger when at least one of the following conditions is satisfied: the magnitude of the pressing force input to the coordinate estimation unit 142 is more than a pressure threshold value; and the rate of change of the force per unit is more than the predetermined value.

It is difficult to determine which position of the display screen is pressed on the basis of the detection result of the force sensor 124 alone. Accordingly, in the present embodiment, a trigger for starting processing for identifying a pressed portion where the display surface is pressed with the finger (pressed coordinate retrieval condition) is set on the basis of the detection result of the force sensor 124, and a determination is made as to whether the processing for identifying the pressed portion is executed. In the present embodiment, information about the contact portion obtained when the force sensor 124 determines that the display surface is pressed in step S110 (or in a time period before and after that time) is used. Accordingly, information about the contact portion obtained when the display surface is pressed can be used, which allows accurate determination of the pressed portion.

When the display surface is determined not to be pressed in step S110, the coordinate estimation unit 142 outputs only the coordinate of each contact portion to the output unit 144, and terminates the processing (S120).

On the other hand, when the display surface is determined to be pressed in step S110, the coordinate estimation unit 142 calculates correlation between change of the pressing force and change of the capacitance at each contact portion over time (S130). More specifically, for example, the change of the capacitance at each contact portion over time can be represented by a change of the size of the contact portion of the finger at the contact coordinate of the electrostatic sensor substrate 122 over (n pieces of) past histories and (m pieces of) future histories with respect to a time when the display surface is determined to be pressed or not in step S110. Alternatively, the change of the capacitance of each contact portion over time can also be represented by a change of the magnitude of the peak value of the capacitance.

Then, a contact portion at which the correlation obtained in step S130 is closest to 1 is estimated as the pressed portion (S140). For example, the graph of FIG. 15 shows peak values of capacitances at two pressed points detected by the electrostatic sensor substrate 122, a detection value of the force sensor 124, and correlation coefficients of waveforms over time where n is 2 and m is 2. The graph of the correlation coefficient shows the correlation coefficient between each pressed point and the detection value provided by the force sensor 124, and the correlation coefficient is represented by the same type of line as the graph representing the pressure. As the correlation coefficient gets closer to one, the degree of relevance is higher. Referring to graph representing the pressure, the base line of the capacitance itself changes greatly, and the capacitance changes in various manners when pressures are applied. Therefore, it is difficult to determine which contact portion is pressed on the basis of the graph representing the pressure alone.

In the present embodiment, the output of the force sensor 124 is also used so that the correlation coefficient between each pressed point and the detection value provided by the force sensor 124 is calculated, and the relevance therebetween is taken into consideration. As the correlation coefficient gets closer to one, the degree of relevance becomes higher. Therefore, when the correlation coefficient gets closer to one, the pressed point at the contact portion can be determined to be a pressed portion. It is possible to clearly find the relevance therebetween that may not be clearly found from the graph representing the pressure even in view of the graph representing the correlation coefficient as shown in FIG. 15. Therefore, it is possible to accurately find a time when the display surface of the mobile apparatus 100 is pressed and a pressed portion.

Thereafter, the coordinate estimation unit 142 outputs, to the output unit 144, the coordinate of each contact portion detected by the electrostatic sensor substrate 122 and a determination command for determining the contact portion estimated in step S140 (S150). The output unit 144 outputs the contact portion and the determination command to a constituent element executing processing on the basis of the determination command and the information about the contact portion, and terminates the processing.

(Retrieval of Relevance)

In step S140, the pressed portion is estimated using the correlation between the change of the pressing force and the change of the capacitance at each contact portion over time. However, the present disclosure is not limited to such example. Alternatively, it is possible to use other information that can be obtained from the detection results provided by the electrostatic sensor substrate 122 and the force sensor 124.

An Example of information that can be obtained from the detection result of the electrostatic sensor substrate 122 includes a coordinate given when the display surface is pressed. In this case, changes of coordinates are compared in terms of magnitude, and a pressed portion can be determined from relevance of a temporal waveform and a frequency waveform with an output provided by the force sensor 124. Alternatively, for example, the magnitudes of movements of a finger may be compared between a current pressing operation and a previous pressing operation, whereby relevance can be observed. Still alternatively, for example, a contact portion at which the rate of change in the size of the contact portion of a finger before and after a certain time is the largest may be adopted as a pressed portion. Alternatively, a contact portion at which the capacitance is the largest, a contact portion at which the difference of capacitances is the largest, and the like may be simply estimated as a pressed portion. When a sensor of a detection method different from that of the electrostatic sensor substrate 122 is used, the magnitude of a resistance value can be used in a resistive film sensor, and the magnitude of the intensity of light can be used in an in-cell optical sensor, for example.

Examples of information that can be obtained from the detection result provided by the force sensor 124 include a temporal waveform, a frequency waveform, and the like. In general, when the display surface is pressed, the frequency increases. A pressed portion can be determined from a contact portion on the basis of relevance between the above information and the information obtained from the electrostatic sensor substrate 122.

In the above explanation, the pressed portion is estimated using the correlation between the change of the pressing force an the change of the capacitance at each contact portion over time. Alternatively, for example, the relevance between the detection result of the electrostatic sensor substrate 122 and the detection result of the force sensor 124 can be represented using an inclination of a regression curve and the like.

(Estimation of a Pressed Portion Using Finger Movement History)

Another method for estimating a pressed portion is a method using finger movement history. More specifically, in many cases, a finger that is considered to be pressed on the display surface is slid immediately before the finger is pressed thereon, or is placed on the touch sensor. Using this user's behavior, movement history at each contact portion is stored to the storage unit 150. When the pressing value attains a value more than a threshold value, the movement history is looked up, and a contact portion where the finger is slid immediately before the finger is pressed or the contact portion where the finger is placed on the touch sensor may be estimated as a pressed portion. In reality, the above determination method is preferably used in an auxiliary manner together with the determination relying on the size of the contact area and the capacitance in order to increase the accuracy of determination. In a rare case, it is difficult to make a determination on the basis of the detection result based on the capacitance alone. In such case, this logic may be used in addition.

(Detection Result Obtained When Characters are Input While Moving Fingers)

Figure 16:
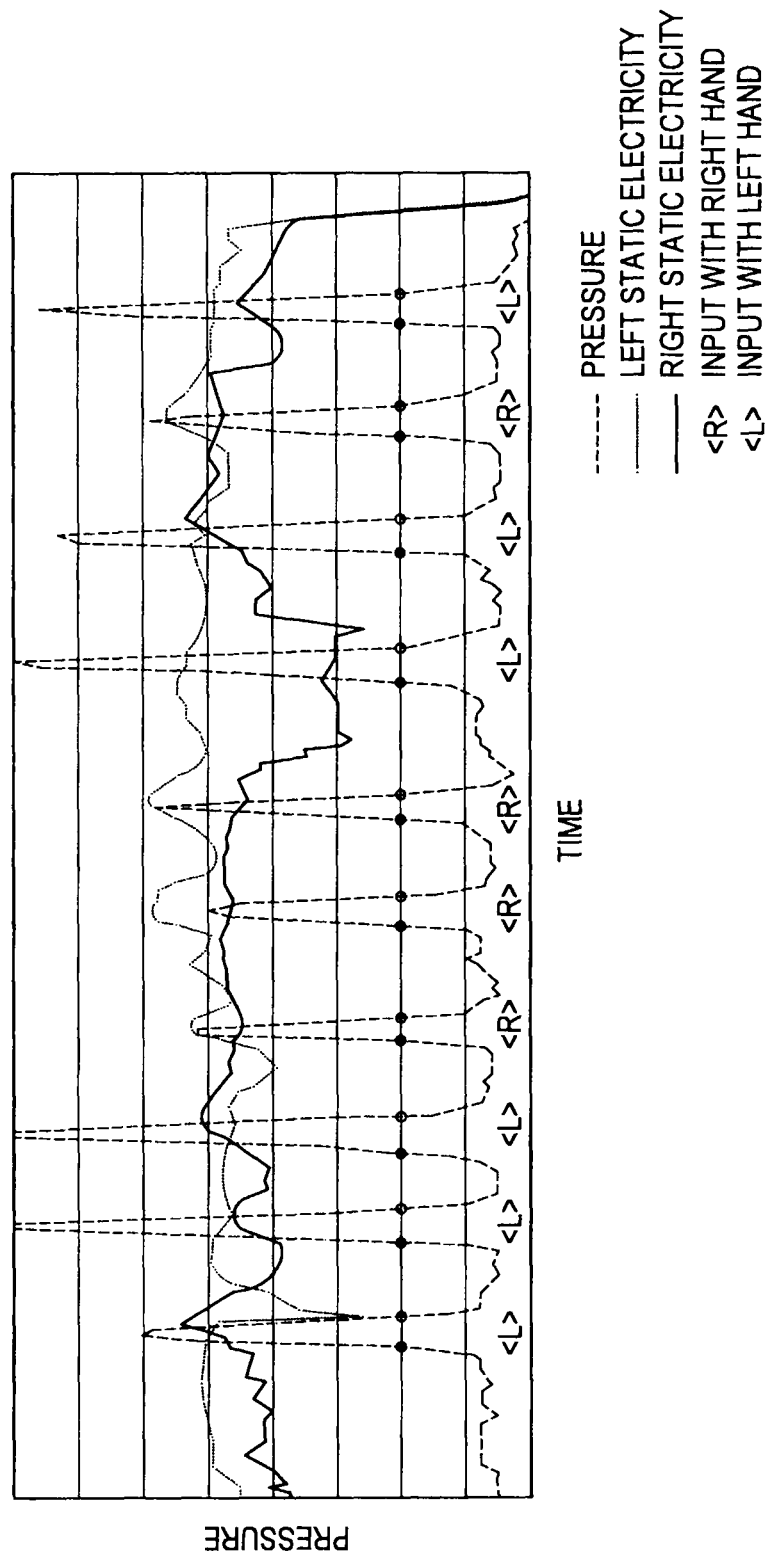
FIG. 16 is a graph illustrating a detection result of the electrostatic sensor substrate and a detection result of the force sensor when a user performs operation/input with both right and left hands while moving fingers.

FIG. 16 illustrates a detection result provided by the electrostatic sensor substrate 122 and a detection result provided by the force sensor 124 when a user performs operation/input with both right and left hands while moving fingers. An operation region of the OSK is divided into a right hand region and a left hand region, and FIG. 16 shows change of capacitance in each of the right hand region and the left hand region. When characters are input with the right hand, the capacitance in the right hand region increases. When characters are input with the left hand, the capacitance in the left hand region increases. It should be noted that the electrostatic sensor substrate 122 may be physically made of only one substrate or may be made of a right side substrate and a left side substrate.

In the graph, <R> denotes an input with the right hand, and <L> denotes an input with the left hand. FIG. 16 shows that while characters are input with the left hand, both of the detection result provided by the force sensor 124 and the capacitance in the left hand region are increasing, and it is understood that these are related to each other. On the other hand, while characters are input with the right hand, both of the detection result provided by the force sensor 124 and the capacitance in the right hand region are increasing. As described above, the manipulation/input performed with both of the right and left hands while moving the fingers can be accurately recognized.

In the example as shown in FIG. 16, a template representing change of the capacitance over time when the display surface is pressed may be obtained in advance, and the template and the detection result provided by the electrostatic sensor substrate 122 may be compared, whereby a determination can be made as to which of the hands is used to perform the operation/input.

For example, it is assumed that the display surface is detected as being pressed in step S110 of the flowchart as shown in FIG. 13. For example, the determination as to whether the display surface is pressed or not may be made as follows. When the detection result provided by the force sensor 124 as described above attains a value more than a predetermined pressure threshold value, the detection result (pressure) may be determined to be more than a position of a black circle in the example of FIG. 16. Then, in step S130, correlation is obtained between the detection result provided by the electrostatic sensor substrate 122 and the template obtained in advance. In step S140, these values are compared statistically, and a contact portion is determined at a position where the change of the capacitance over time is detected as matching the template with the highest degree of correlation.

In this case, the correlation may be calculated using n pieces of histories subsequent to a time when a trigger is detected, or may be calculated using n pieces of past histories and m pieces of future histories with respect to a time when a trigger is detected. In other words, a pressed portion may be estimated by obtaining correlation between the capacitance and the template obtained in advance, instead of obtaining the correlation between the detection result (capacitance) provided by the electrostatic sensor substrate 122 and the detection result (pressure) provided by the force sensor 124.

Alternatively, the trigger for starting processing for identifying a pressed portion may be activated when the detection result attains a value less than a second pressure threshold value after the detection result provided by the force sensor 124 attains a value larger than a first pressure threshold value. For example, in the example as shown in FIG. 16, the trigger is activated when the detection result (pressure) attains a value less than a position of a white circle after the detection result (pressure) attains a value higher than the position of the black circle. When the trigger is detected in step S110, the coordinate estimation unit 142 obtains correlation between the detection result provided by the electrostatic sensor substrate 122 and the template obtained in advance in step S130. Then, in step S140, the coordinate estimation unit 142 statistically compares these values, and determines a contact portion at a position where the change of the capacitance over time is detected as matching the template with the highest degree of correlation.

At this occasion, the correlation may be calculated as follows. For example, a time when the detection result provided by the force sensor 124 attains a value larger than a first pressure threshold value is adopted as a reference point (black circle of FIG. 16), and a time when the detection result provided by the force sensor 124 attains a value less than a second pressure threshold value is adopted as an end point (white circle of FIG. 16). The correlation may be calculated using n pieces of histories between the reference point and the end point. The number of past histories n used for the calculation of the correlation is indefinite. A plurality of templates may be prepared in accordance with the number of past histories n used for the calculation of the correlation. Alternatively, only one template may be prepared, and may be increased in accordance with the number of past histories n.

As described above, information representing change of the capacitance and the like over time when the display surface is pressed is obtained as the template in advance, whereby the pressed portion can be estimated on the basis of the template and the detection result provided by the electrostatic sensor substrate 122 without using the detection result provided by the force sensor 124. In this case, the correlation between the template and the detection result provided by the electrostatic sensor substrate 122 is calculated with respect to the change of the capacitance over time. However, the present disclosure is not limited to such example. Alternatively, it is possible to calculate the relevance using the information that can be obtained from the detection result provided by the electrostatic sensor substrate 122 as described above.

<3. Application to Other Input Devices>

Figure 17:
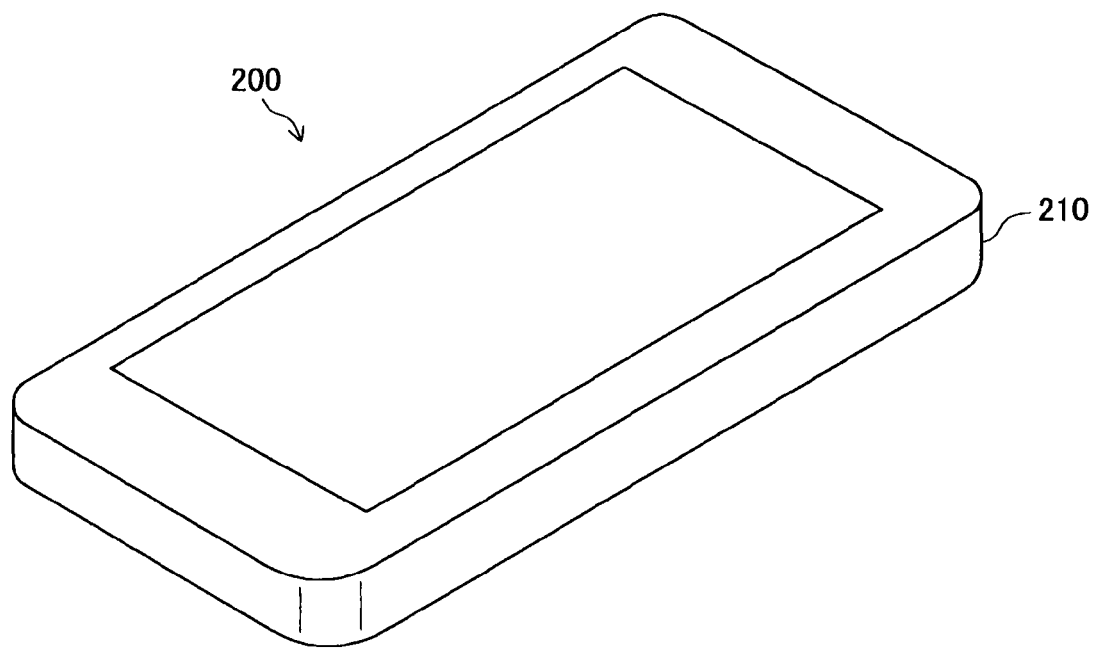
FIG. 17 is a schematic perspective view illustrating a remote controller having a processor for performing contact coordinate estimation processing.
Figure 18:
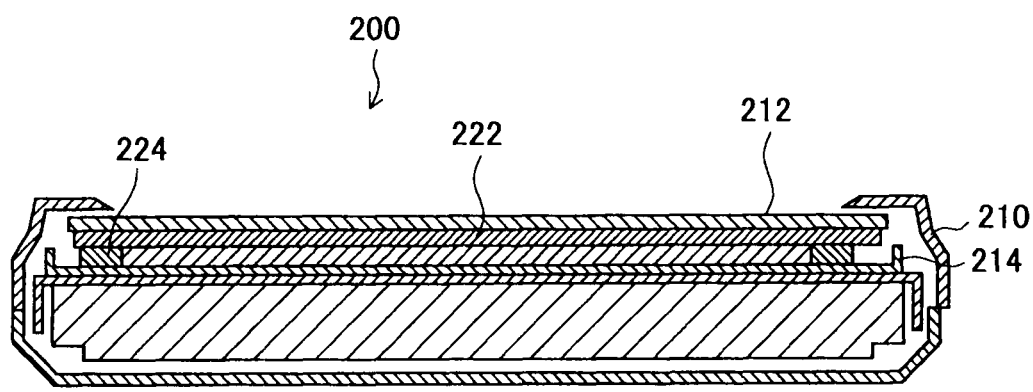
FIG. 18 is a cross sectional view illustrating the configuration of the remote controller of FIG. 17.
Figure 19:
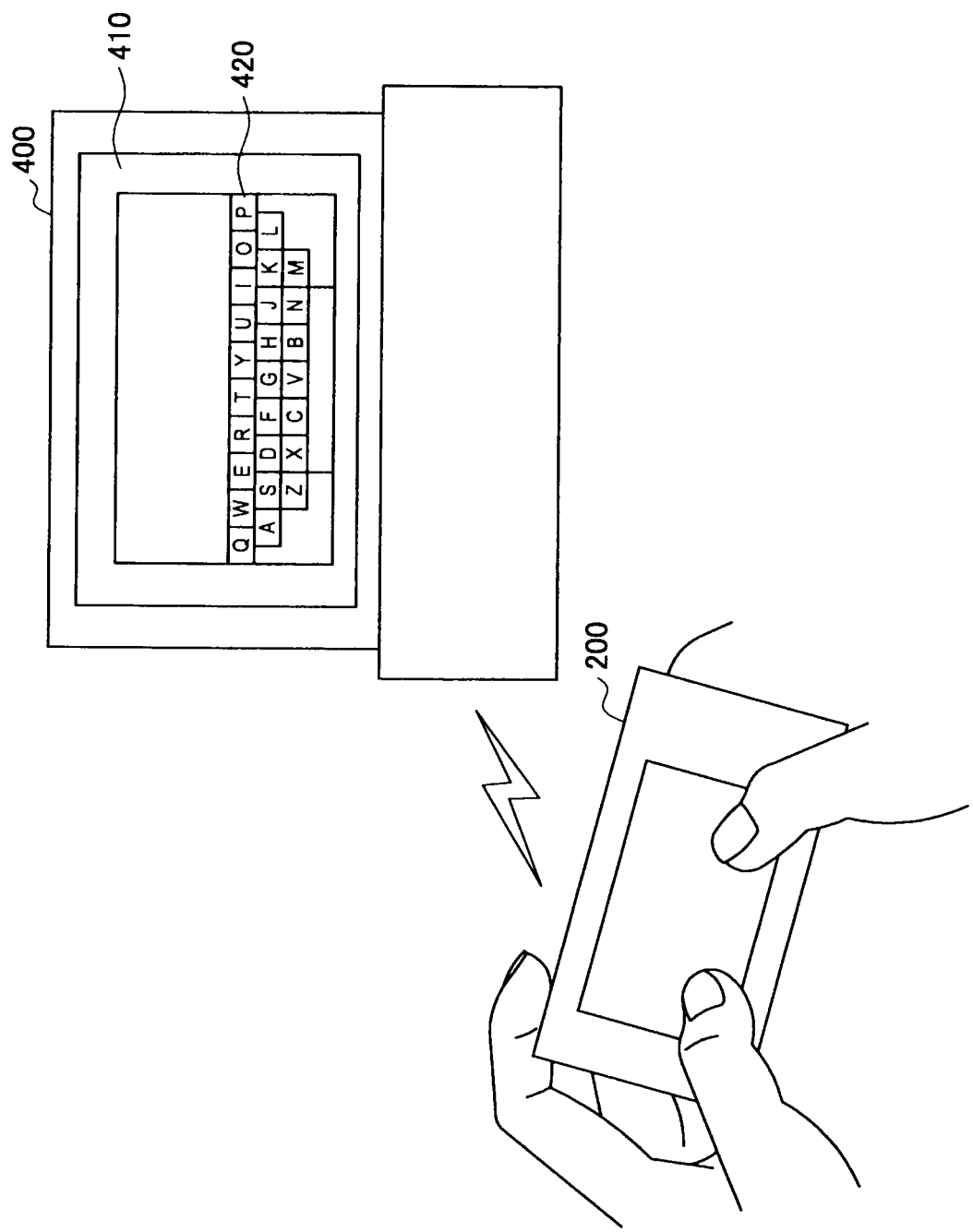
FIG. 19 is an explanatory diagram illustrating a state where a user performs character input operation to a television set using the remote controller of FIG. 17.

In the present embodiment, the OSK is activated on the mobile apparatus 100, and a user operates the mobile apparatus 100. However, the contact coordinate estimation processing according to the present embodiment can also be applied to other input devices. For example, as shown in FIGS. 17 to 19, the contact coordinate estimation processing according to the present embodiment can be applied to a remote controller 200. In the future, a larger number of television channels will become available, and IPTVs will become widely available. Therefore, it is expected that, for example, opportunities of keyword searches will greatly increase. In this circumstance, the contact coordinate estimation processing according to the present embodiment is applied to the remote controller 200, so that a user can input characters to a television set at a high speed.

As shown in FIGS. 17, 18, the remote controller 200 includes a main substrate including a touch sensor, an MPU, and the like, a battery, an antenna for communication with a television set (not shown), and the like, arranged in a body 210 that can be held by a hand. A cover 212, a contact sensor substrate 222, and a force sensor 224 are provided in this order from the operation surface side (upper side of FIG. 18). The force sensor 224 is fixed to a receiving plate 214 in the body 210. The receiving plate 214 is fixed to the body 210.

When characters are input to the television set 400 using the remote controller 200, an OSK 420 is displayed on a display 410 of the television set 400 as shown in FIG. 19. At this occasion, even when the remote controller 200 does not have a display, a user can confirm a position of a finger brought into contact with the operation surface of the remote controller 200 by looking at a display 410 of the television set 400. Therefore, while the user looks at the display 410 of the television set 400, the user touches an character keys associated with keys to be input, and presses the character keys, thereby inputting characters to a character input area (not shown) of the television set 400.

When a user uses a remote controller and a keyboard in the related art, the user typically looks at the keyboard to find the positions of the keys. In contrast, when the contact coordinate estimation processing according to the present embodiment is applied, the user does not have to look at the keyboard, which makes it less cumbersome for the user to operate the device.

Figure 20:
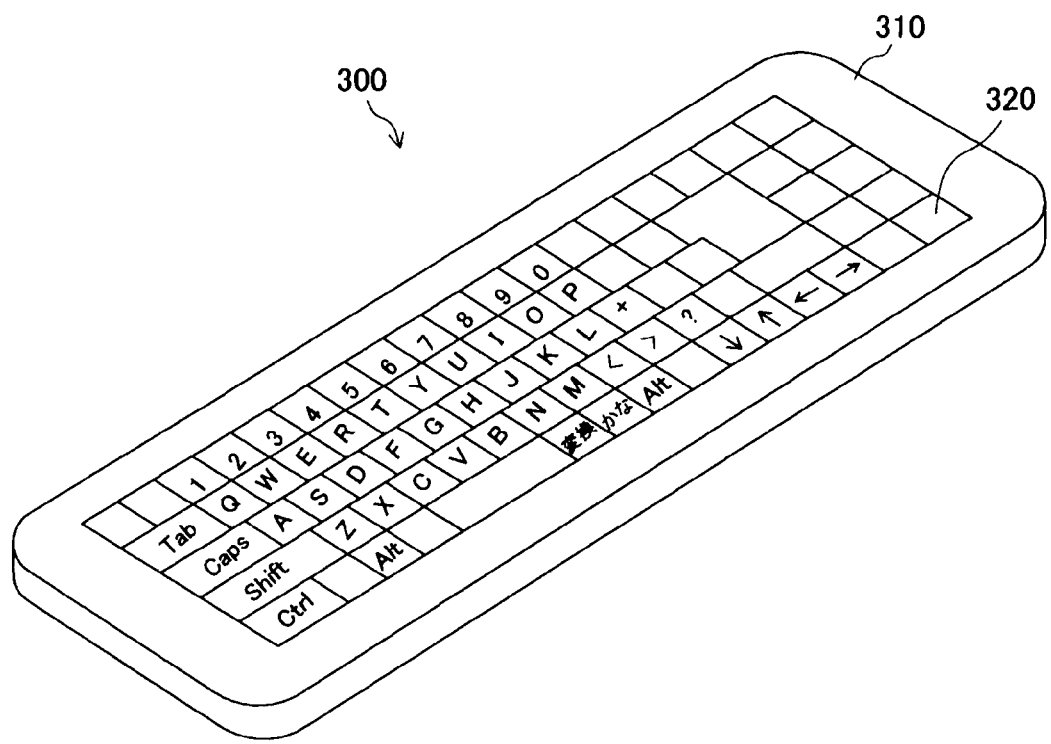
FIG. 20 is a schematic perspective view illustrating a full keyboard having a processor for performing contact coordinate estimation processing.
Figure 21:
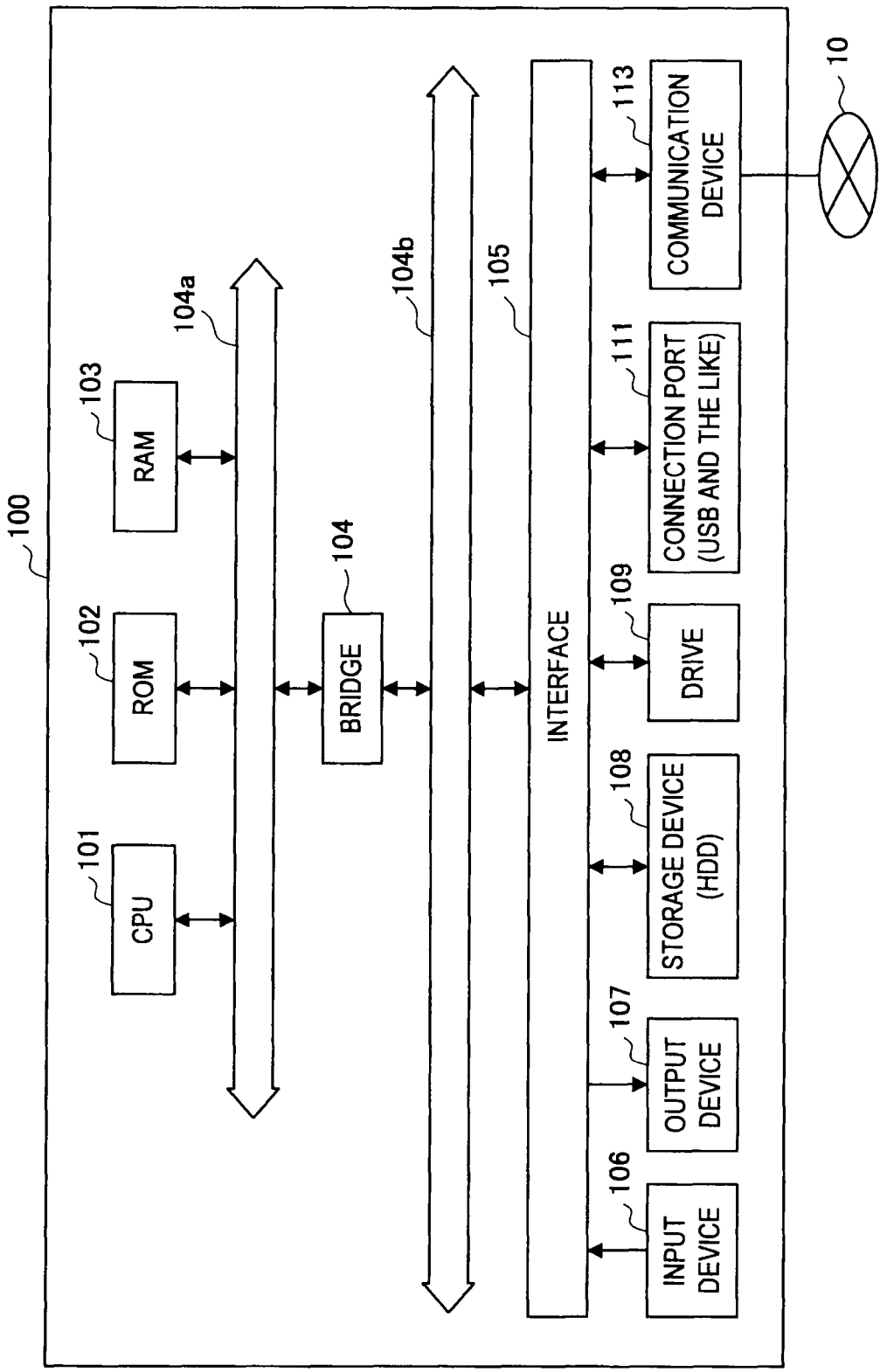

Another example to which the contact coordinate estimation processing according to the present embodiment can be applied is a touch-type full keyboard 300 as shown in FIG. 20. An upper surface of a body 310 of the full keyboard 300 is formed such that a touch surface for input operation is made flat, and key letters are printed on the touch surface. Textures may be added to the touch surface on the upper surface of the body 310 so that the user can recognize the positions of the keys using the sense of touch.

Even when the user places the fingers of the both hands on the touch surface simultaneously, the contact positions of the fingers can be determined by the contact coordinate estimation processing. Then, the coordinate estimation unit 142 identifies a pressed portion of the touch surface, thereby finding which key letter is input.

The configuration of the input device (for example, mobile apparatus 100) having the processor 140 performing the coordinate estimation processing according to the present embodiment and the contact coordinate estimation processing have been hereinabove explained. According to the present embodiment, the electrostatic sensor substrate 122 capable of detecting multi-touch gesture and the force sensor 124 for detecting load applied to the device are provided. The coordinate estimation unit 142 estimates a pressed portion on the basis of a calculation result of an output signal provided by the electrostatic sensor substrate 122 at the time when a trigger is activated by an output of the force sensor 124, or before and after the trigger is activated. At this occasion, the coordinate estimation unit 142 may estimate a pressed portion on the basis of a calculation result of output signals provided by the electrostatic sensor substrate 122 and the force sensor 124.

Pressing is determined as described above, and a pressed portion where a determining operation is performed is estimated and determined from multiple contact portions. Accordingly, even when there are multiple contact portions, the pressed portion can be distinguished. Therefore, there are fewer limitations imposed on operations, and the operability can be improved. Since the limitations imposed on operation are reduced, it is less cumbersome for a user to operate the device. Further, the output signals provided by the electrostatic sensor substrate 122 and the force sensor 124 are used to identify a pressed portion, so that a detection error can be reduced when the pressed portion is determined. Moreover, the configuration of the device is simple, and the device can be achieved at a low cost. In addition, the device can be achieved with a high degree of reliability. On the other hand, the force sensor 124 can be arranged with a high degree of flexibility, and the reliability of the device can be ensured. In addition, the device can be designed with a high degree of flexibility.

<4. Example of Hardware Configuration>

The processing of the mobile apparatus 100 and the like according to the present embodiment can be executed by hardware or by software. In this case, the mobile apparatus 100 and the like can be made as a computer as shown in FIG. 13. An example of hardware configuration of the mobile apparatus 100 and the like according to the present embodiment will be hereinafter explained with reference to FIG. 13.

As described above, the mobile apparatus 100 and the like according to the present embodiment can be achieved with a processing apparatus such as a computer. As shown in FIG. 13, the mobile apparatus 100 and the like includes a CPU (Central Processing Unit) 101, a ROM (Read Only Memory) 102, a RAM (Random Access Memory) 103, and a host bus 104a. In addition, the mobile apparatus 100 and the like includes a bridge 104, an external bus 104b, an interface 105, an input device 106, an output device 107, a storage device (HDD) 108, a drive 109, a connection port 111, and a communication device 113.

The CPU 101 functions as a calculation processing apparatus and a control device, so as to control overall operation in the mobile apparatus 100 and the like according to various kinds of programs. The CPU 101 may be a microprocessor. The ROM 102 stores programs, calculation parameters, and the like used by the CPU 101. The RAM 103 temporarily stores programs used during execution of the CPU 101 and parameters and the like that change as necessary during the execution. These are connected with each other by the host bus 104a constituted by a CPU bus and the like.

The host bus 104a is connected to the external bus 104b such as a PCI (Peripheral Component Interconnect/Interface) bus via the bridge 104. It should be noted that it is not necessary to separately arrange the host bus 104a, the bridge 104, and the external bus 104b. These functions may be implemented with only one bus.

The input device 106 includes, for example, an input means with which a user inputs information, such as a mouse, a keyboard, a touch panel, buttons, a microphone, switches, and levers, an input control circuit for generating an input signal based on user input and outputting the input signal to the CPU 101, and the like. The output device 107 includes, for example, a display device such as a liquid crystal display (LCD) device, an OLED (Organic Light Emitting Diode) device, and lamps, or an audio output device such as a speaker.

The storage device 108 is an example of a storage unit for the mobile apparatus 100 and the like. The storage device 108 is device for storing data. The storage device 108 may include a storage medium, a recording device for recording data to the recording medium, a reading device for reading data from the recording medium, an erasing device for erasing data recorded in the recording medium, and the like. The storage device 108 is constituted by, for example, an HDD (Hard Disk Drive). The storage device 108 drives the hard disk and stores programs executed by the CPU 101 and various kinds of data.

The drive 109 is a reader/writer for a storage medium. The drive 109 is provided in the mobile apparatus 100 and the like, or is attached externally to the mobile apparatus 100 and the like. The drive 109 reads information recorded in a loaded removable recording medium such as a magnetic disk, an optical disk, a magneto-optical disk, and a semiconductor memory, and outputs the information to the RAM 103.

The connection port 111 is an interface for connecting to an external device, i.e., a connection port for connecting to the external device capable of transmitting data using, for example, USB (Universal Serial Bus) and the like. For example, the communication device 113 is a communication interface constituted by a communication device for connecting to a communication network 10 and the like. The communication device 112 may be a communication device supporting wireless LAN (Local Area Network), a communication device supporting wireless USB, or may be a wired communication device for communicating via a wire.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-132753 filed in the Japan Patent Office on Jun. 10, 2010, the entire content of which is hereby incorporated by reference.

What is claimed is:

1. An information processing apparatus comprising:
a contact detection unit capable of detecting a plurality of contact coordinates on an operation surface, and outputting a contact detection signal as a detection result;

a load detection unit for detecting a load applied to the operation surface; and a coordinate estimation unit, wherein when a load detection result provided by the load detection unit satisfies a pressed coordinate retrieval condition, the coordinate estimation unit estimates a pressed coordinate from among the plurality of contact coordinates on the operation surface, on the basis of at least the contact detection signal, the coordinate estimation unit determining a contact coordinate that changes most greatly from coordinate history information obtained from the contact detection signal before the load detection result satisfies the pressed coordinate retrieval condition, and adopting the determined contact coordinate as the pressed contact coordinate.

2. The information processing apparatus according to claim 1, wherein the coordinate estimation unit obtains relevance between the contact detection signal and the load detection result from the load detection result provided by the load detection unit and the contact detection signal, and the coordinate estimation unit determines a contact coordinate whose relevance is equal to or more than a predetermined value, and adopts the determined contact coordinate as the pressed coordinate.

3. The information processing apparatus according to claim 1, wherein the contact detection unit outputs, as the contact detection signal, one of a contact size and a contact intensity at the contact coordinate.

4. The information processing apparatus according to claim 3, wherein the coordinate estimation unit determines a contact coordinate at which a magnitude of the contact detection signal obtained from the operation surface changes most greatly, and adopts the determined contact coordinate as the pressed coordinate.

5. The information processing apparatus according to claim 3, wherein the coordinate estimation unit determines a contact coordinate at which a degree of similarity is the largest between a waveform representing change of the contact detection signal at each contact coordinate and a waveform representing change of the load detection result provided by the load detection unit over time, and adopts the determined contact coordinate as the pressed coordinate.

6. The information processing apparatus according to claim 1, wherein the coordinate estimation unit outputs coordinate history information at the each contact coordinate as the contact detection signal.

7. The information processing apparatus according to claim 1, wherein the pressed coordinate retrieval condition is determined to hold when the load detection result provided by the load detection unit attains a value more than a load threshold value.

8. The information processing apparatus according to claim 1, wherein the pressed coordinate retrieval condition is determined to hold when a rate of change of the load detection result provided by the load detection unit attains a value more than a load change threshold value.

9. An information processing method comprising:

causing a contact detection unit capable of detecting a plurality of contact coordinates on an operation surface to output a contact detection signal as a detection result;

causing a load detection unit to detect a load applied to the operation surface; and when a load detection result provided by the load detection unit satisfies a pressed coordinate retrieval condition, causing the coordinate estimation unit to estimate a pressed coordinate from among the plurality of contact coordinates on the operation surface, on the basis of at least the contact detection signal, the coordinate estimation unit determining a contact coordinate that changes most greatly from coordinate history information obtained from the contact detection signal before the load detection result satisfies the pressed coordinate retrieval condition, and adopting the determined contact coordinate as the pressed contact coordinate.

10. A non-transitory computer readable medium encoded with a computer program for causing a computer to perform a method comprising:

controlling a contact detection unit capable of detecting a plurality of contact coordinates on an operation surface, and obtaining a contact detection signal as a detection result from the contact detection unit;

causing a load detection unit to detect a load applied to the operation surface; and estimating a pressed coordinate from among the plurality of contact coordinates on the operation surface, on the basis of at least the contact detection signal when a load detection result provided by the load detection unit satisfies a pressed coordinate retrieval condition, the estimating including determining a contact coordinate that changes most greatly from coordinate history information obtained from the contact detection signal before the load detection result satisfies the pressed coordinate retrieval condition, and adopting the determined contact coordinate as the pressed contact coordinate.

11. An information processing apparatus comprising:

a contact detection unit capable of detecting a plurality of contact coordinates on an operation surface, and outputting a contact detection signal as a detection result;

a load detection unit for detecting a load applied to the operation surface; and a coordinate estimation unit, wherein when a load detection result provided by the load detection unit satisfies a pressed coordinate retrieval condition, the coordinate estimation unit estimates a pressed coordinate from among the plurality of contact coordinates on the operation surface, on the basis of at least the contact detection signal, the coordinate estimation unit determining a contact coordinate from the contact detection signal in a period of time before the load detection result satisfies the pressed coordinate retrieval condition, and adopting the determined contact coordinate as the pressed contact coordinate.

* * * * *